(12) United States Patent
Djordjevic

(10) Patent No.: US 9,178,976 B2
(45) Date of Patent: Nov. 3, 2015

(54) APPARATUS AND METHOD FOR USING A SMARTPHONE

(75) Inventor: Boris Djordjevic, Devon (CA)

(73) Assignee: MITAB INC. (CA)

( * ) Notice: Subject to any disclaimer, the term of this patent is extended or adjusted under 35 U.S.C. 154(b) by 19 days.

(21) Appl. No.: 13/882,630

(22) PCT Filed: Nov. 1, 2011

(86) PCT No.: PCT/CA2011/001211
§ 371 (c)(1),
(2), (4) Date: Apr. 30, 2013

(87) PCT Pub. No.: WO2012/058753
PCT Pub. Date: May 10, 2012

(65) Prior Publication Data
US 2013/0217442 A1    Aug. 22, 2013

Related U.S. Application Data

(60) Provisional application No. 61/408,914, filed on Nov. 1, 2010.

(51) Int. Cl.
 *H04B 1/38* (2015.01)
 *H04M 1/725* (2006.01)
(Continued)

(52) U.S. Cl.
 CPC ......... *H04M 1/72527* (2013.01); *G06F 1/1626* (2013.01); *G06F 1/1632* (2013.01); *H04B 1/3888* (2013.01); *H04M 1/18* (2013.01); *H04M 2250/22* (2013.01); *H04W 4/00* (2013.01); *H04W 84/12* (2013.01); *H04W 84/18* (2013.01); *H04W 88/02* (2013.01)

(58) Field of Classification Search
 CPC ............ G06F 1/1626; H04M 1/72527; H04M 2250/22
 USPC .......................................................... 455/557
 See application file for complete search history.

(56) References Cited

U.S. PATENT DOCUMENTS

| 6,101,087 A | 8/2000 | Sutton et al. |
| 6,115,618 A | 9/2000 | Lebby et al. |

(Continued)

FOREIGN PATENT DOCUMENTS

| CA | 2737778 | 10/2012 |
| EP | 2 197 185 | 6/2010 |

(Continued)

OTHER PUBLICATIONS

International Search Report for PCT/CA2011/001211 dated Jan. 23, 2012.

(Continued)

*Primary Examiner* — David Bilodeau
(74) *Attorney, Agent, or Firm* — Heslin Rothenberg Farley & Mesiti, P.C.

(57) ABSTRACT

An apparatus and method is provided for using a smartphone is provided. The apparatus can include a tablet having a slot for receiving a cartridge configured to receive and interface with the smartphone. The tablet can further have a touch screen configured to operate the smartphone when loaded into the cartridge and inserted into the cartridge slot. The tablet can further have an external or auxiliary antenna disposed in the housing configured to interface with the smartphone.

16 Claims, 7 Drawing Sheets

(51) Int. Cl.
*G06F 1/16* (2006.01)
*H04B 1/3888* (2015.01)
*H04M 1/18* (2006.01)
*H04W 4/00* (2009.01)
*H04W 84/12* (2009.01)
*H04W 84/18* (2009.01)
*H04W 88/02* (2009.01)

(56) References Cited

U.S. PATENT DOCUMENTS

| | | | |
|---|---|---|---|
| 6,141,667 A | 10/2000 | Duff | |
| 6,327,482 B1 | 12/2001 | Miyashita | |
| 6,489,932 B1 | 12/2002 | Chitturi et al. | |
| 6,580,422 B1 | 6/2003 | Reilly | |
| 6,697,032 B2 | 2/2004 | Chitturi et al. | |
| 6,850,226 B2 | 2/2005 | Finke-Anlauff | |
| 6,895,259 B1 | 5/2005 | Blank nee Keller et al. | |
| 6,961,237 B2 | 11/2005 | Dickie | |
| 6,999,792 B2 | 2/2006 | Warren | |
| 7,003,328 B2 | 2/2006 | Kuwazoe | |
| 7,076,270 B2 | 7/2006 | Jaggers et al. | |
| 7,197,584 B2 | 3/2007 | Huber et al. | |
| 7,199,787 B2 | 4/2007 | Lee et al. | |
| 7,266,391 B2 | 9/2007 | Warren | |
| 7,339,783 B2 | 3/2008 | McEwan et al. | |
| 7,477,919 B2 | 1/2009 | Warren | |
| 7,512,402 B2 | 3/2009 | Narayanaswami et al. | |
| 7,522,412 B2 | 4/2009 | McEwan et al. | |
| D595,288 S | 6/2009 | Roach et al. | |
| 7,543,099 B2 | 6/2009 | Han | |
| 7,595,981 B2 | 9/2009 | Chen et al. | |
| 7,778,197 B2 | 8/2010 | Kim | |
| 8,072,392 B2 | 12/2011 | Lection | |
| 2004/0121801 A1* | 6/2004 | Tom | 455/556.1 |
| 2004/0217937 A1 | 11/2004 | Moskalik et al. | |
| 2004/0217992 A1 | 11/2004 | Oskulak et al. | |
| 2005/0099360 A1 | 5/2005 | Yueh | |
| 2005/0185364 A1 | 8/2005 | Bell et al. | |
| 2006/0246945 A1 | 11/2006 | Lee | |
| 2007/0010289 A1 | 1/2007 | Mezue | |
| 2008/0155159 A1 | 6/2008 | Rivas et al. | |
| 2008/0270665 A1 | 10/2008 | Senatori et al. | |
| 2008/0273297 A1 | 11/2008 | Kumar | |
| 2008/0304688 A1 | 12/2008 | Kumar | |
| 2009/0023475 A1 | 1/2009 | Chang et al. | |
| 2009/0089676 A1 | 4/2009 | Finkelstein et al. | |
| 2009/0146909 A1 | 6/2009 | Lection | |
| 2009/0209287 A1 | 8/2009 | Ravelo | |
| 2010/0244765 A1 | 9/2010 | Collopy et al. | |
| 2010/0250816 A1 | 9/2010 | Collopy et al. | |
| 2010/0250817 A1 | 9/2010 | Collopy et al. | |
| 2010/0250818 A1 | 9/2010 | Gill et al. | |
| 2010/0251243 A1 | 9/2010 | Gill et al. | |
| 2010/0318709 A1 | 12/2010 | Bell et al. | |
| 2011/0102348 A1 | 5/2011 | Moran et al. | |
| 2011/0256905 A1 | 10/2011 | Ryan | |
| 2011/0298726 A1 | 12/2011 | Wu et al. | |
| 2012/0054401 A1 | 3/2012 | Cheng | |
| 2012/0087078 A1 | 4/2012 | Medica et al. | |
| 2012/0117290 A1 | 5/2012 | Sirpal et al. | |
| 2012/0194455 A1 | 8/2012 | Hsu et al. | |
| 2013/0016483 A1 | 1/2013 | Chuang et al. | |

FOREIGN PATENT DOCUMENTS

| | | |
|---|---|---|
| GB | 2486505 | 6/2012 |
| WO | 2010/110960 A2 | 9/2010 |
| WO | 2010/110960 A3 | 9/2010 |
| WO | 2011007332 | 1/2011 |
| WO | 2011135352 | 11/2011 |
| WO | 2012008922 | 1/2012 |
| WO | 2012060585 | 5/2012 |
| WO | 2012108626 | 8/2012 |
| WO | 2012134536 | 10/2012 |
| WO | 2012160328 | 11/2012 |

OTHER PUBLICATIONS

Supplementary European Search Report and Search Opinion—EP 1183755.4, (PCT/CA2011001211) dated Dec. 9, 2014, 6 pages.

* cited by examiner

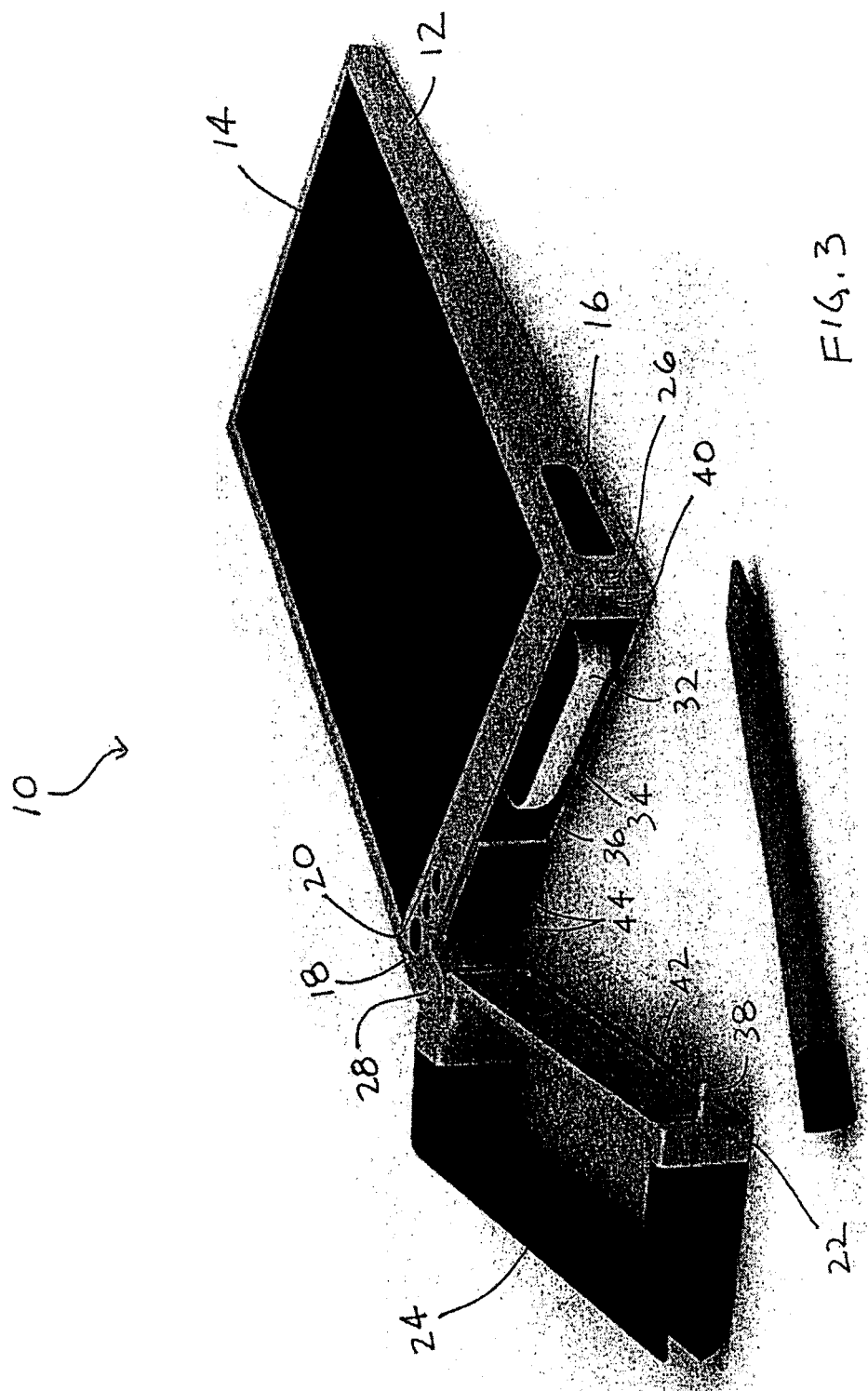

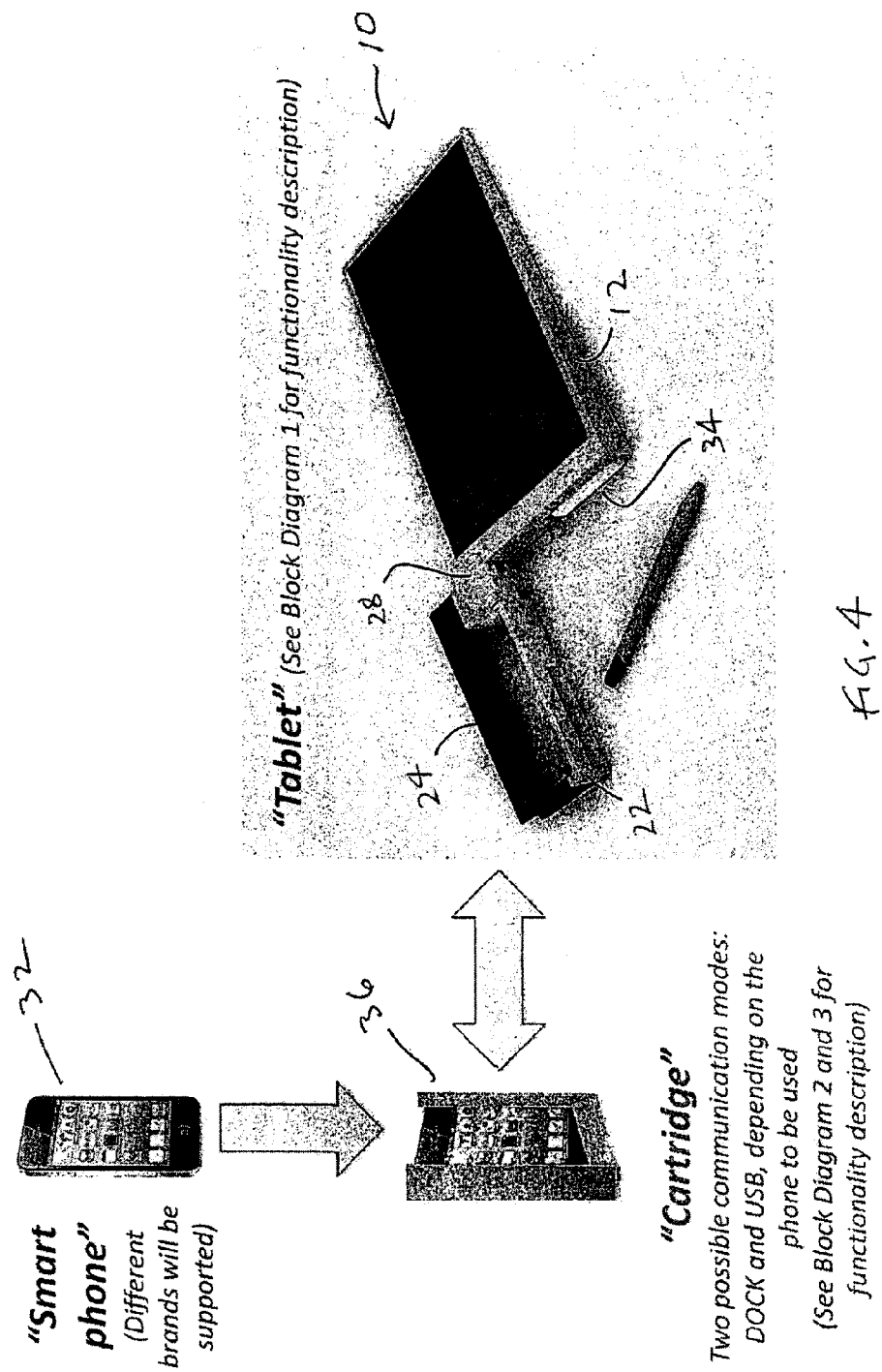

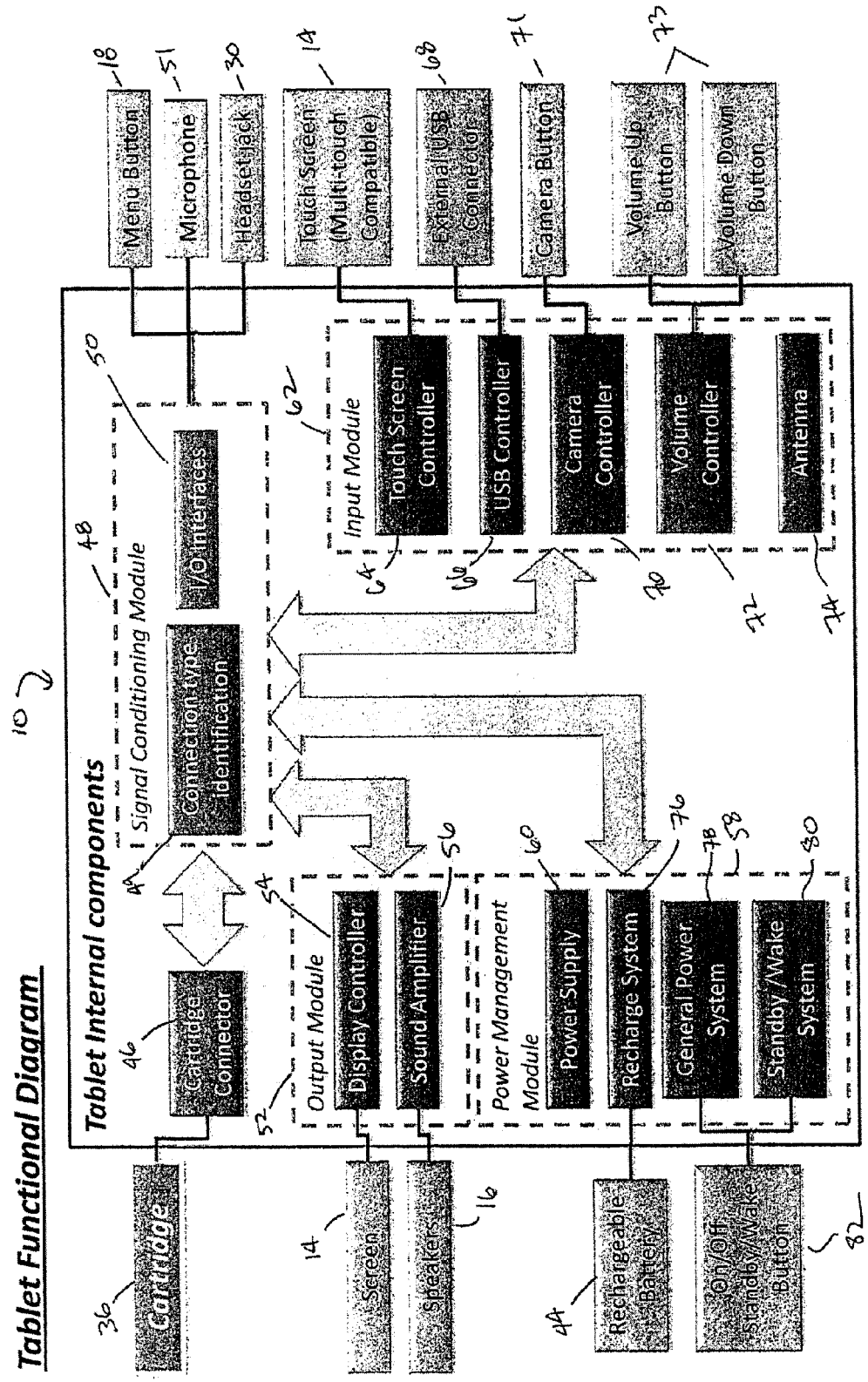

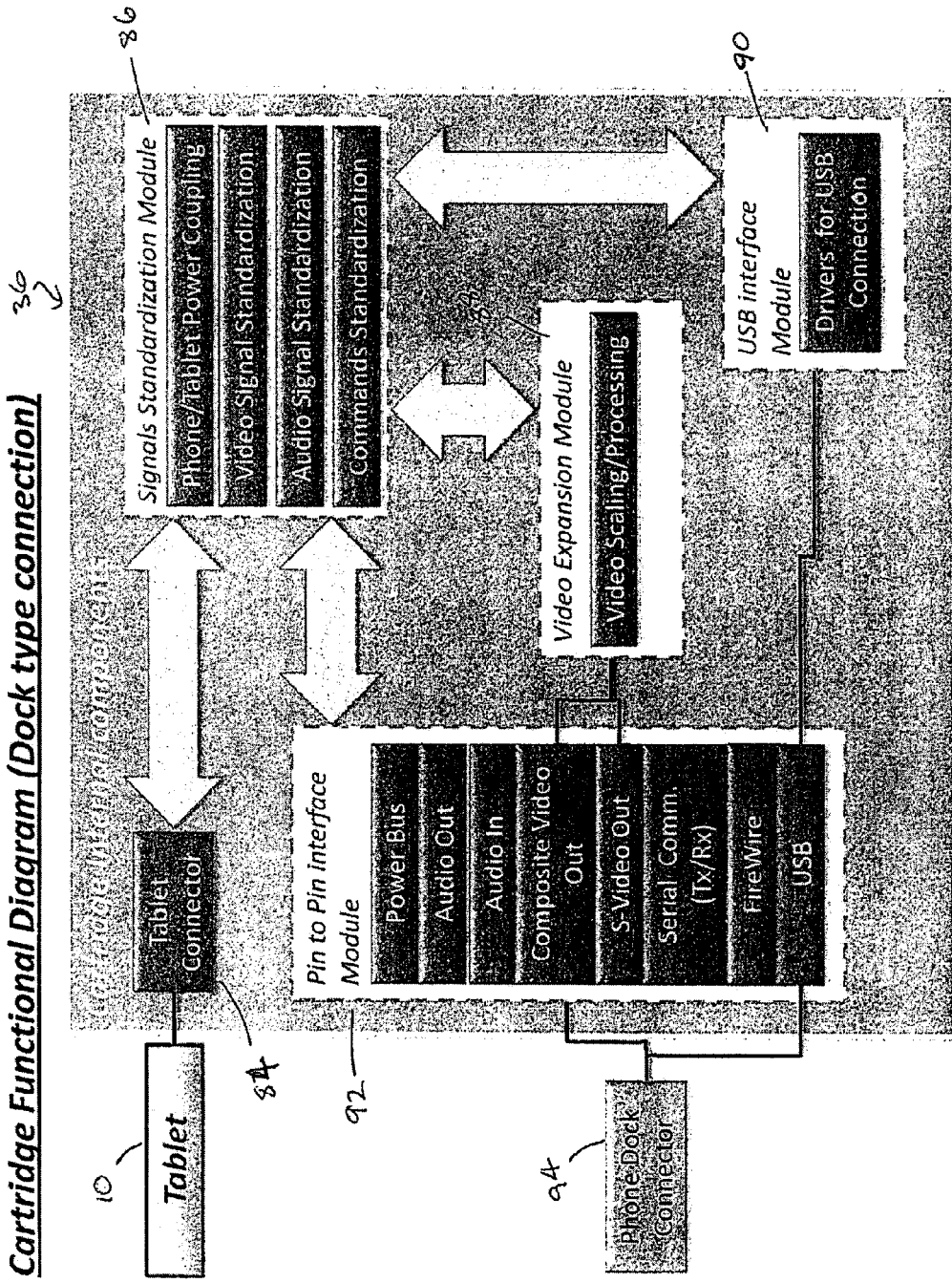

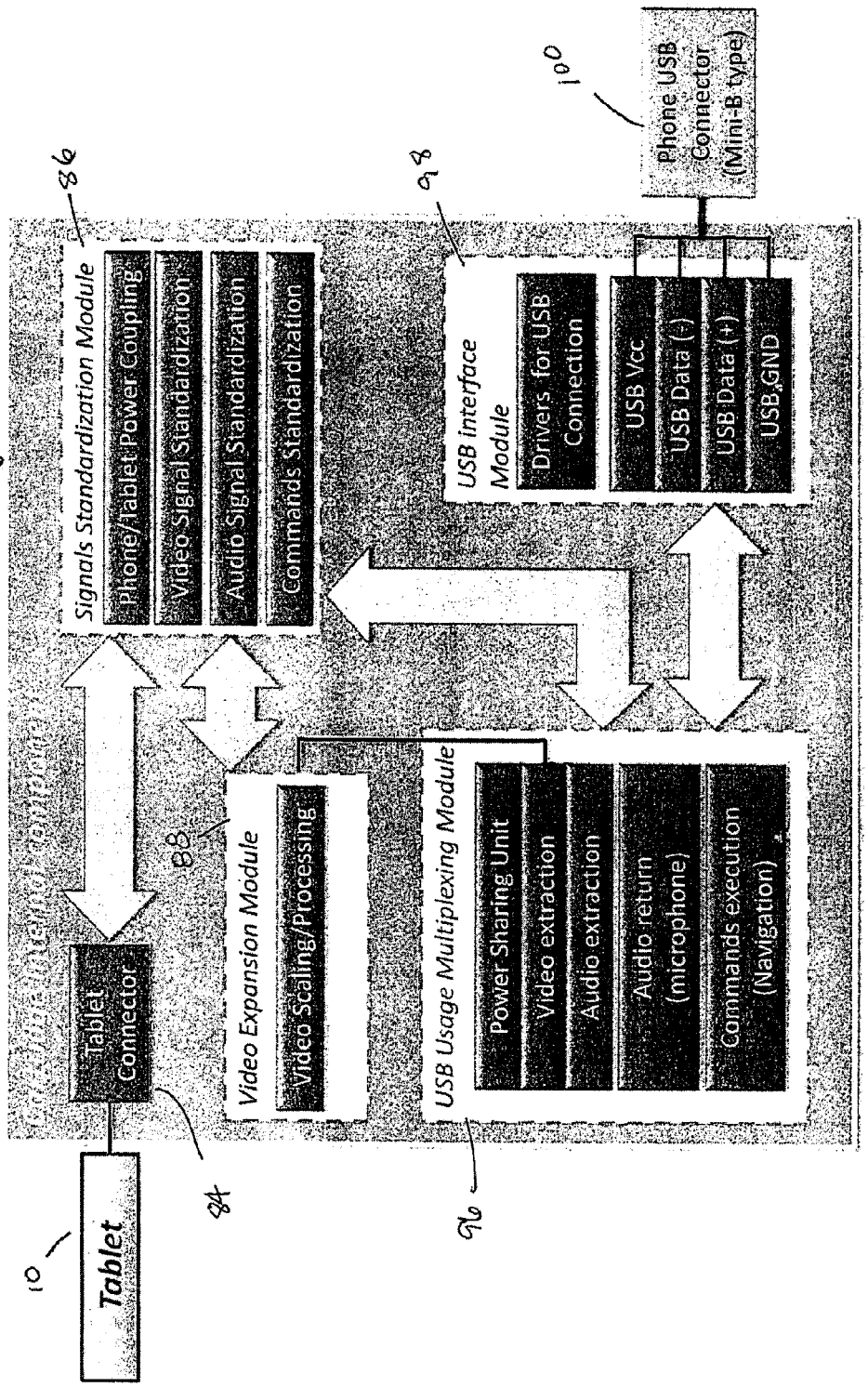

APPARATUS AND METHOD FOR USING A SMARTPHONE

CROSS-REFERENCE TO RELATED APPLICATIONS

This application is a national stage filing under section 371 of International Application No. PCT/CA2011/001211 filed on Nov. 1, 2011, and published in English on May 10, 2012 as WO 2012/058753 A1 and claims priority of U.S. provisional patent application Ser. No. 61/408,914 filed Nov. 1, 2010, the entire disclosure of these applications being hereby incorporated herein by reference.

TECHNICAL FIELD

The present disclosure is related to the field of accessory devices for use with smartphones, in particular, tablet devices for use with smartphones that make interfacing with smartphones easier to use, and for using the smartphone in industrial applications or in harsh atmospheric conditions.

BACKGROUND

Advances in mobile and cellular telephone technology have resulted in a class of phones known as "smartphones" that combine cellular telephone technology with computing technology. Examples of such smartphones include the iPhone™ as manufactured by Apple Corporation and the Blackberry™ as manufactured by Research In Motion Ltd., among others. The computing capabilities that smartphones possess enable them to be used for many uses and applications. A spin-off industry has evolved for third-party software developers to develop applications, or "apps" as they are known, for use on smartphones that can use the physical features built into the smartphones for any variety of uses, interests and applications. These apps can be downloaded by the user onto their smartphone, either from the Internet or from their cellphone service provider.

Smartphones can also include touch screens that enable users to interface with their smartphones by simply touching icons displayed on the touch screen. A limiting factor in using smartphones is that the touch screen, and the icons displayed thereon, may be too small for a user to discern or operate. Another limiting factor is that most smartphones are consumer-grade products that are not robust enough for use in industrial applications or in harsh atmospheric conditions.

It is, therefore, desirable to provide an apparatus and method for using a smartphone that overcomes their shortcomings.

SUMMARY

An apparatus and method for using a smartphone is provided. In some embodiments, the apparatus can comprise a tablet having a large touch screen that can display the visual information displayed on the smartphone except in a larger format that can be easier to read and operate for a user. The tablet can further comprise control buttons and indicator lights that emulate or mimic the function of such elements disposed on the smartphone. In some embodiments, the tablet can comprise a microphone, one or more speakers and a headset jack that extend these functional features from the smartphone to the tablet. In some embodiments, the tablet can comprise a power supply that can let the smartphone operate for a longer period of time than is possible with the smartphone internal power supply or battery.

In some embodiments, the apparatus can further comprise a smartphone-specific cartridge that can be inserted into a slot disposed on the tablet and connect thereto via a universal electrical connection thereby enabling the tablet to work with a variety of smartphones by using the specific cartridge for any particular smartphone. In some embodiments, the smartphone can be enclosed in the housing of the tablet to protect the smartphone from the elements. In some embodiments, that tablet can be made of materials suitable for consumer-grade products. In some embodiments, the table can be made of materials suitable for use in industrial applications or in harsh atmospheric conditions.

In some embodiments, the tablet can comprise an antenna disposed therein that can function as an external or an auxiliary antenna for the smartphone. In some embodiments, the tablet can comprise passive or active components to increase the distance the smartphone can communicate with a base station of a cellular telecommunications network. In some embodiments, these components can comprise an external or auxiliary antenna that has more gain than the internal antenna of the smartphone. In other embodiments, these components can comprise an RF transmitter or amplifier that can work with or replace the RF transmitter of the smartphone to increase the output RF signal power of the smartphone. In further embodiments, these components can comprise an RF preamplifier to increase the input RF signal sensitivity of the smartphone.

In some embodiments, a method for using a smartphone is provided. In some embodiments, the method comprises the steps of providing a tablet as described above and a cartridge for use with a particular smartphone. The smartphone can be placed into the cartridge, which can then be inserted into the cartridge slot disposed on the tablet. The smartphone can then be operated using the control buttons and touch screen of the tablet. Different smartphone can be used with the tablet by inserting the smartphone into a cartridge that is designed to interface with the smartphone, and then inserting the loaded cartridge into the cartridge slot disposed on the tablet.

Broadly stated, in some embodiments, an apparatus is provided for using a smartphone, comprising: a tablet further comprising a housing; a touch screen disposed on the housing; a cartridge slot disposed on the housing; a cartridge configured to receive the smartphone, the cartridge further configured to be inserted into the cartridge slot; and means for interfacing with the smartphone wherein the touch screen is configured to operate the smartphone.

Broadly stated, in some embodiments, a method is provided for using a smartphone, the method comprising the steps of: providing an apparatus for using the smartphone, comprising: a tablet further comprising a housing, a touch screen disposed on the housing, a cartridge slot disposed on the housing, a cartridge configured to receive the smartphone, the cartridge further configured to be inserted into the cartridge slot, and means for interfacing with the smartphone wherein the touch screen is configured to operate the smartphone; inserting the smartphone into the cartridge; inserting the loaded cartridge into the cartridge slot; and operating the smartphone by operating the touch screen.

Broadly stated, in some embodiments, the apparatus can further comprise at least one control button disposed on the tablet for controlling a function of the smartphone.

Broadly stated, in some embodiments, the apparatus can further comprise audio interface means.

Broadly stated, in some embodiments, the apparatus can further comprise power supply means.

Broadly stated, in some embodiments, the apparatus can further comprise an external or auxiliary antenna configured to interface with the smartphone.

Broadly stated, in some embodiments, the apparatus can further comprise means for transmitting or receiving radio frequency ("RF") wireless signals. In further embodiments, the RF wireless signals can comply with IEEE 802.11 Wi-Fi™ or Bluetooth™ wireless communication protocols.

Broadly stated, in some embodiments, the housing can further comprise a lid configured to enclose the smartphone in the housing when the lid is attached to the housing.

BRIEF DESCRIPTION OF THE DRAWINGS

FIG. 3 is a perspective view depicting the apparatus of FIG. 1 with the lid open.

FIG. 4 is a block diagram depicting a smartphone being inserted into the apparatus of FIG. 1.

FIG. 5 is a block diagram depicting the functional components of the apparatus of FIG. 1.

FIG. 6 is a block diagram depicting the functional components of a first embodiment of a cartridge for use with the apparatus of FIG. 1.

FIG. 7 is a block diagram depicting the functional components of a second embodiment of a cartridge for use with the apparatus of FIG. 1.

DETAILED DESCRIPTION OF EMBODIMENTS

Figure 1:
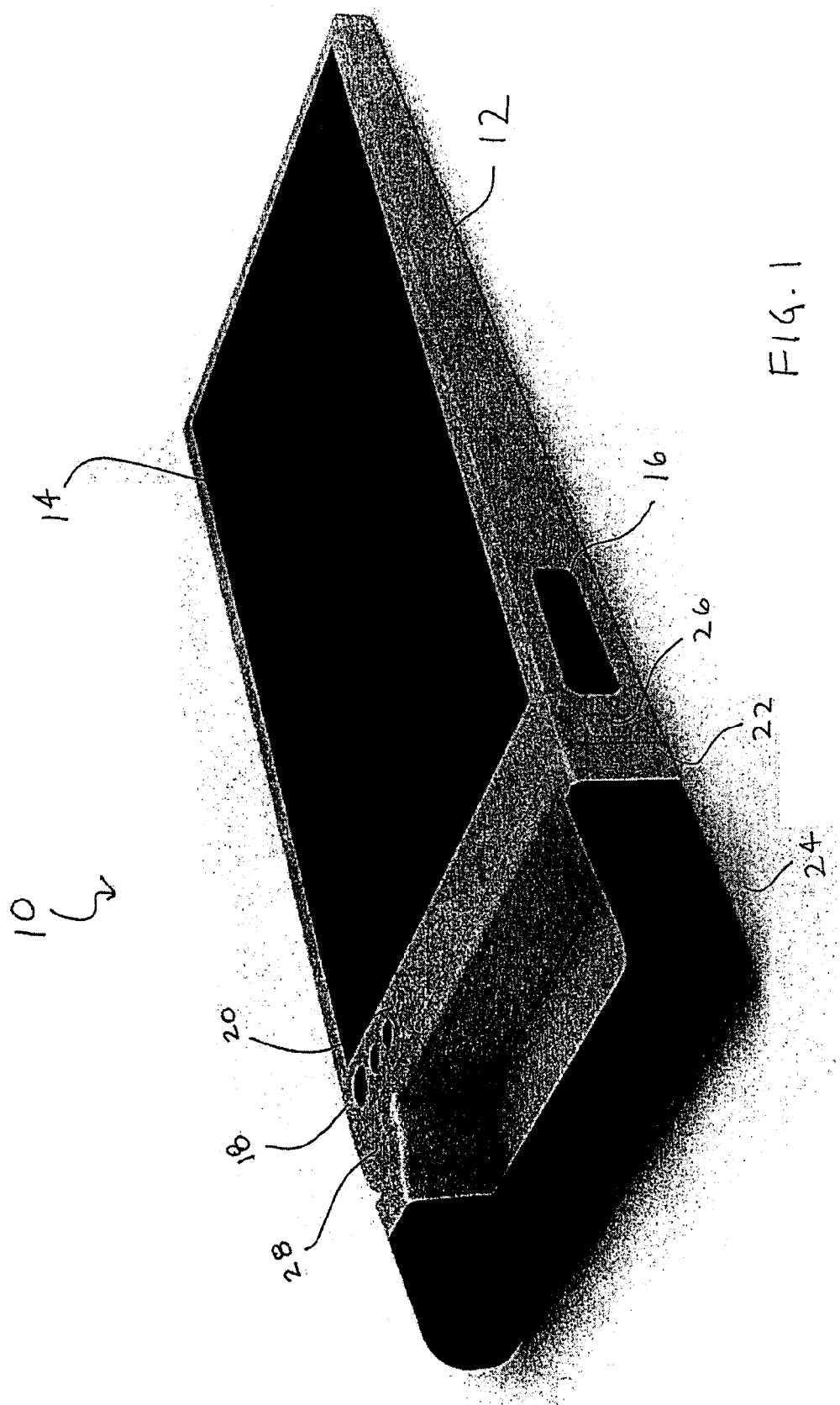
FIG. 1 is a perspective view depicting an apparatus for using a smartphone.
Figure 2:
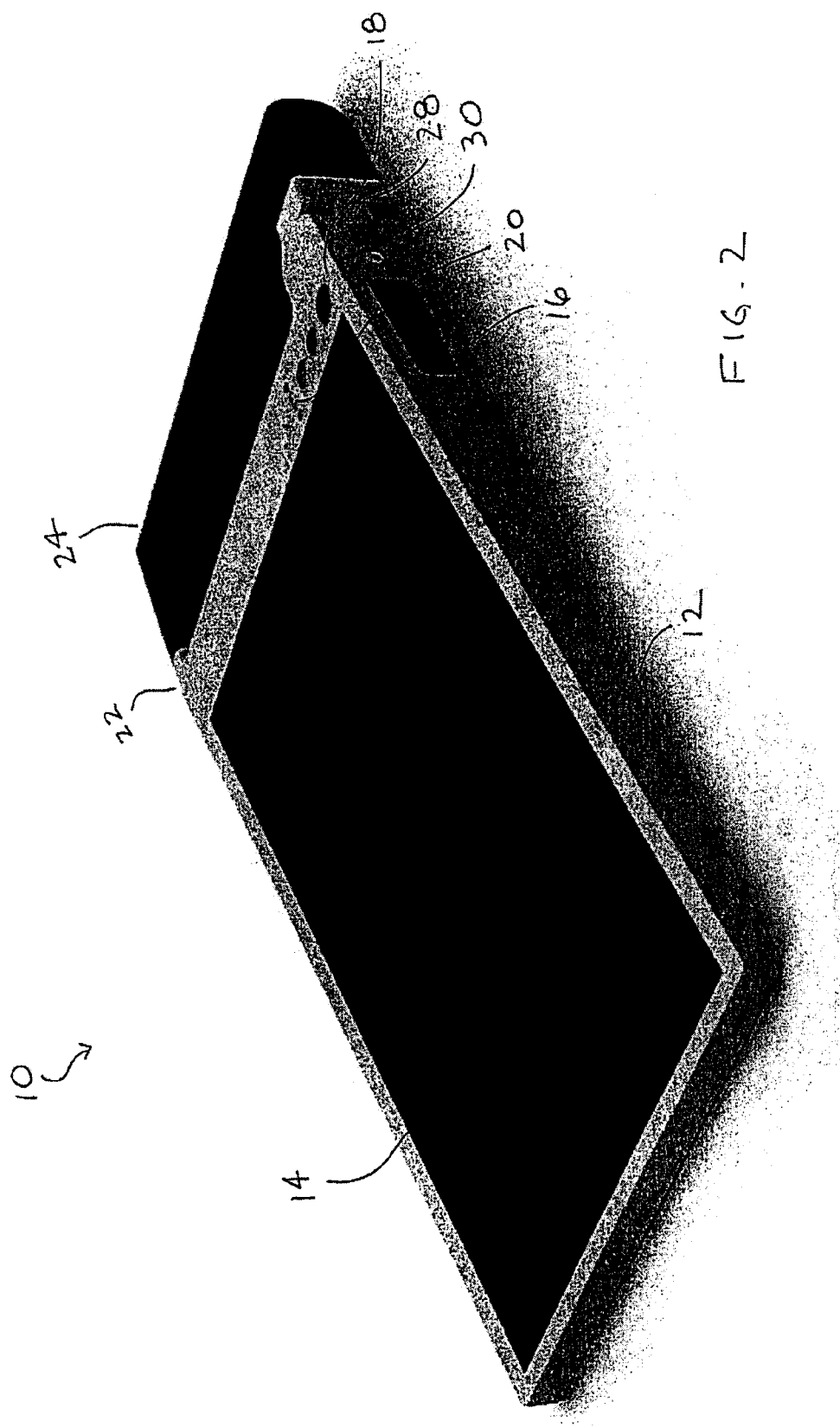
FIG. 2 is a perspective view depicting the apparatus of FIG. 1.

Referring to FIGS. 1 to 3, one embodiment of an apparatus for using a smartphone is shown. In some embodiments, the apparatus can comprise tablet 10, further comprising housing 12. Housing 12 can further comprise touch screen 14, as well known to those skilled in the art. Housing 12 can be of any size and shape, the configuration of which can be a mere design consideration to be selected as needed or required by a person skilled in the art. Housing 12 can be comprised of any suitable material for housing a smartphone. In some embodiments, housing 12 can be comprised of a plastic or composite material as suitable for a consumer-grade product, as well known to those skilled in the art. In other embodiments, housing 12 can be comprised of metal or other hardened material(s), as well known to those skilled in the art, suitable for use in industrial applications or in harsh atmospheric conditions, where tablet 10 can be exposed to extreme temperatures or pressures, or to gaseous, liquid or solid materials that can be harmful or destructive to consumer-grade materials.

Referring to FIG. 3, housing 12 can comprise cartridge slot 34 that can be configured to receive and interface with cartridge 36. In some embodiments, cartridge 36 can be configured to receive and interface with smartphone 32, either through a docking connector (not shown) disposed on smartphone 32 or a USB connector (not shown) disposed on smartphone 32.

In some embodiments, tablet 10 can comprise an internal power supply (not shown) having one or more batteries 44 that can be configured to power smartphone 32 when connected to tablet 10.

In some embodiments, tablet 10 can comprise audio interface means for interfacing with smartphone 32. These means can comprise one or more speaker 16 disposed on housing 12. These means can also comprise jack 30 disposed on housing 12 that can be configured to receive a plug connected to an external microphone (not shown), headphones (not shown) or a headset (not shown) that can combine a microphone with headphones. These means can also comprise a microphone disposed on housing 12.

In some embodiments, housing 12 can comprise control buttons 18 and indicator lights 20 to operate and monitor the functions of smartphone 32 when inserted into tablet 10. Control buttons 18 can be configured to turn smartphone 32 on or off, to operate a camera disposed on smartphone 32, to turn the volume up or down or any other function of smartphone 32, to operate the menus on smartphone 32 or any other function of smartphone 32. In some embodiments, indicator lights 20 can be configured to visually indicate operational parameters or conditions of smartphone 20, such as power on or off, transmitting or receiving data, or any other parameter or condition as well known to those skilled in the art.

In some embodiments, tablet 10 can comprise lid 22 hingeably attached to housing 12. In further embodiments, lid 22 can comprise pin 38 configured to be received by catch 40 disposed on housing 12 wherein lid 22 can be closed and attached to housing 12 such that smartphone 32 can be enclosed therein. Housing 12 can further comprise catch release button 26 that, when depressed, opens lid 22 to allow smartphone 32 and cartridge 36 to be removed from tablet 10. In other embodiments, lid 22 can further comprise gasket 42 that can be disposed between lid 22 and housing 12 when lid 22 is closed thereby resulting in a seal to block any foreign materials from entering cartridge slot 34. In other embodiments, lid 22 can further comprise handle 24 to aid in carrying table 10.

Referring to FIG. 4, smartphone 32 is shown being inserted into cartridge 36. Cartridge 36, once loaded with smartphone 32, can be inserted into cartridge slot 34 disposed in housing 12.

Referring to FIG. 5, a block diagram showing the functional aspects or features of some embodiments of tablet 10 is shown. In some embodiments, tablet 10 can comprise signal conditional module 48 operatively connected to cartridge connector 46 that, in turn, can be configured to connect with cartridge 36. Module 48 can comprise connection type identifier 49 that can be configured to identify the type of connection that is being made with the smartphone inserted in cartridge 36. Module 48 can further comprise input/output interface 50 that can be configured to interface with control buttons 18, microphone 51 or headset jack 30, as examples.

In some embodiments, tablet 10 can comprise output module 52 operatively connected to module 48. Module 52 can be configured to comprise display controller 54 for controlling data displayed on touch screen 14. Module 52 can also comprise sound amplifier 56 operatively connected to speakers 16 to amplify audio signals played through speakers 16.

In some embodiments, tablet 10 can comprise input module 62 operatively connected to module 48. Input module 62 can comprise touch screen controller 64 for receiving and interpreting signals received from touch screen 14 when being operated by a user. Module 62 can also comprise USB controller 66 for controlling data transmitted and received through external USB connector 68. Module 62 can further comprise camera controller 70 operatively connected to camera button 71 for operating the camera disposed on smartphone 32, if so equipped. Module 62 can also comprise volume controller 72 operatively connected to volume up/down buttons 73 for controlling the volume of audio signals played through speakers 16. In some embodiments, module 62 can comprise antenna 74, which can be disposed in housing 12 and be configured to operate as an external or auxiliary antenna for smartphone 32. In some embodiments, tablet 10 can further comprise passive or active components operatively connected to antenna 74, and configured to increase the distance that smartphone 32 can communicate with a base station of a cellular or wireless telecommunications network. These components can comprise means for increasing the transmit RF signal power of smartphone 32, for increasing the sensitivity of the RF signal receiver of smartphone 32, for increasing the gain of the antenna of smartphone 32, or combinations thereof, or of any other means as well known to those skilled in the art. In some embodiments, tablet 10 can comprise means for transmitting and/or receiving RF signals that comply with the Bluetooth™ or IEEE 802.11 Wi-Fi™ wireless communication protocols, or with any other near-field wireless communications protocol as well known to those skilled in the art.

In some embodiments, tablet 10 can comprise power management module 58 operatively connected to module 48. Module 58 can comprise power supply 60, which can further comprise charging system 76 operatively connected to rechargeable battery 44. Module 58 can further comprise general power system 78 that can be operatively coupled to standby/wake system 80 and on/off/standby/wake button 82. General power system 78 can be configured to optimize the operating time of tablet 10 by controlling the power consumed by tablet 10 using power management techniques as well known to those skilled in the art. As an example, power system 78 can be configured to power down the RF transceiver of smartphone 32 or put smartphone 32 into a standby mode when tablet 10 is not being used to minimize the power being consumed from batteries 44. In some embodiments, power management module 58 can further comprise means for wirelessly charging rechargeable battery 44, as well known to those skilled in the art.

Referring to FIG. 6, a block diagram showing the functional aspects or features of some embodiments of cartridge 36 shown. In this figure, a cartridge configured to connect with a phone dock connector disposed on smartphone 32 is shown. In some embodiments, cartridge 36 can comprise tablet connector 84 that can couple with cartridge connect 46 (as shown in FIG. 5). Tablet connect 84 can be operatively connected to signals standardization module 86, which can be configured to provide power coupling from tablet 10 to smartphone 36, to standardize the video signals to and from smartphone 32, to standardize the audio signals to and from smartphone 32 and to standardize the commands to and from smartphone 32.

In some embodiments, module 86 can be operatively connected to interface module 92, which can be operatively connected to phone dock 94 that can connect to smartphone 32 when smartphone 32 is inserted into cartridge 36. Interface module 92 can comprise the physical electrical connections between smartphone 32 and cartridge 36. The electrical connections can comprise the power bus, the audio out and in connections, the composite video out signal, the S-Video out signal, the transmit and received serial data communication connections, a FireWire™ connection and a USB connection.

In some embodiments, cartridge can comprise video expansion module 88 disposed and operatively connected between module 86 and interface module 92, which can be configured to scale and process the video signals from smartphone 32. In some embodiments, cartridge 36 can comprise USB interface module 90 disposed and operatively connected between module 86 and interface module 92, which can be configured to comprise drivers for a USB connection with smartphone 32.

Referring to FIG. 7, a block diagram showing the functional aspects or features of some embodiments of cartridge 36 shown. In this figure, a cartridge configured to connect with a phone USB connector (a Mini-B type, as an example) disposed on smartphone 32 is shown. In some embodiments, cartridge 36 can comprise tablet connector 84 that can couple with cartridge connect 46 (as shown in FIG. 5). Tablet connect 84 can be operatively connected to signals standardization module 86, which can be configured to provide power coupling from tablet 10 to smartphone 36, to standardize the video signals to and from smartphone 32, to standardize the audio signals to and from smartphone 32 and to standardize the commands to and from smartphone 32.

In some embodiments, module 86 can be operatively connected to USB usage multiplexing module 96, which can be configured to comprise a power sharing unit, a video extraction unit, an audio extraction unit, an audio return (microphone) unit and a commands execution (navigation) unit. In some embodiments, cartridge can comprise video expansion module 88 disposed and operatively connected between module 86 and module 96, which can be configured to scale and process the video signals from smartphone 32.

In some embodiments, cartridge 36 can comprise USB interface module 98 operatively connected to module 96, which can be configured to comprise drivers for a USB connection with smartphone 32, and the physical electrical connections with phone USB connector 100 that can couple with the USB connector disposed on smartphone 32 when inserted into cartridge 36. The electrical connections can comprise the USB rail voltage (Vcc), USB ground, and USB data (−) and USB data (+).

Although a few embodiments have been shown and described, it will be appreciated by those skilled in the art that various changes and modifications might be made without departing from the scope of the invention. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

I claim:

1. An apparatus for using a smartphone, comprising:
   a tablet further comprising a housing;
   a touch screen disposed on the housing;
   a cartridge slot disposed on the housing;
   a cartridge configured to receive the smartphone, the cartridge further configured to be inserted into the cartridge slot, wherein the smartphone comprises a screen, and wherein the screen of the smartphone is enclosed by the housing when smartphone is received by the cartridge and the cartridge is inserted into the cartridge slot; and
   means for interfacing with the smartphone wherein the touch screen is configured to operate the smartphone.

2. The apparatus as set forth in claim 1, further comprising at least one control button disposed on the tablet for controlling a function of the smartphone.

3. The apparatus as set forth in claim 1, further comprising audio interface means.

4. The apparatus as set forth in claim 1, further comprising power supply means.

5. The apparatus as set forth in claim 1, further comprising an external or auxiliary antenna configured to interface with the smartphone.

6. The apparatus as set forth in claim 5, further comprising means for transmitting or receiving radio frequency ("RF") wireless signals.

7. The apparatus as set forth in claim 6, wherein the RF wireless signals comply with IEEE 802.11 Wi-Fi™ or Bluetooth™ wireless communication protocols.

8. The apparatus as set forth in claim 1, wherein the housing further comprises a lid configured to enclose the smartphone in the housing when the lid is attached to the housing.

9. A method for using a smartphone, the method comprising:
   providing an apparatus for using the smartphone, comprising:
   a tablet further comprising a housing,
   a touch screen disposed on the housing,
   a cartridge slot disposed on the housing,
   a cartridge configured to receive the smartphone, the cartridge further configured to be inserted into the cartridge slot, wherein the smartphone comprises a screen, and wherein the screen of the smartphone is enclosed by the housing when the smartphone is received by the cartridge and the cartridge is inserted into the cartridge slot, and
   means for interfacing with the smartphone wherein the touch screen is configured to operate the smartphone;
   inserting the smartphone into the cartridge;
   inserting the loaded cartridge into the cartridge slot; and
   operating the smartphone by operating the touch screen.

10. The method as set forth in claim 9, wherein the apparatus further comprises at least one control button disposed on the tablet for controlling a function of the smartphone.

11. The method as set forth in claim 9, wherein the apparatus further comprises audio interface means.

12. The method as set forth in claim 9, wherein the apparatus further comprises power supply means.

13. The method as set forth in claim 9, wherein the apparatus further comprises an external or auxiliary antenna configured to interface with the smartphone.

14. The method as set forth in claim 13, wherein the apparatus further comprises means for transmitting or receiving radio frequency ("RF") wireless signals.

15. The method as set forth in claim 14, wherein the RF wireless signals comply with IEEE 802.11 Wi-Fi™ or Bluetooth™ wireless communication protocols.

16. The method as set forth in claim 9, wherein the housing further comprises a lid configured to enclose the smartphone in the housing when the lid is attached to the housing.

\* \* \* \* \*